(12) United States Patent
Seok et al.

(10) Patent No.: US 7,386,050 B2
(45) Date of Patent: Jun. 10, 2008

(54) FAST HALF-PEL SEARCHING METHOD ON THE BASIS OF SAD VALUES ACCORDING TO INTEGER-PEL SEARCH AND RANDOM VARIABLE CORRESPONDING TO EACH MACRO BLOCK

(75) Inventors: Jinwuk Seok, Taejon (KR); Pyeong Soo Mah, Taejon (TW); Hyung Kook Jun, Taejon (KR); Bumho Kim, Seoul (KR); Yong Ki Son, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 969 days.

(21) Appl. No.: 10/740,603

(22) Filed: Dec. 22, 2003

(65) Prior Publication Data
US 2005/0111553 A1 May 26, 2005

(30) Foreign Application Priority Data
Oct. 15, 2003 (KR) .................. 10-2003-0071936

(51) Int. Cl.
*H04N 7/12* (2006.01)
(52) U.S. Cl. ............................ 375/240.17; 382/236
(58) Field of Classification Search ........... 348/699, 348/398, 415.1, 416.1, 402.1, 407.1, 413, 348/413.1; 375/240.17, 240.16, 240.24, 375/240.12, 240.01, 240.29, 240.2; 382/236, 382/238, 235, 232, 250
See application file for complete search history.

(56) References Cited

U.S. PATENT DOCUMENTS

| | | | |
|---|---|---|---|
| 6,765,965 B1 * | 7/2004 | Hanami et al. | .......... 375/240.9 |
| 6,876,703 B2 * | 4/2005 | Ismaeil et al. | ......... 375/240.16 |
| 6,996,181 B2 * | 2/2006 | Seok | .................... 375/240.16 |
| 2003/0072374 A1 * | 4/2003 | Sohm | .................... 375/240.16 |
| 2004/0105495 A1 * | 6/2004 | Lee | .......................... 375/240.16 |

FOREIGN PATENT DOCUMENTS

| | | |
|---|---|---|
| KR | 1997-19648 | 4/1997 |
| KR | 1997-25178 | 5/1997 |
| KR | 1997-64262 | 9/1997 |
| KR | 2000-46060 | 6/2002 |

* cited by examiner

*Primary Examiner*—Tung Vo
*Assistant Examiner*—Behrooz Senfi
(74) *Attorney, Agent, or Firm*—Lowe Hauptman Ham & Berner LLP

(57) ABSTRACT

The present invention relates to a half-pel motion estimation method. The calculation object half-pel, which is in the block of the previous or next reference frame, is not estimated additionally for each block of the current frame divided into blocks of a predetermined size. The present invention suggests an algorithm that can perform half-pel search only with a SAD value used in integer-pel search and a random variable for correcting errors. Since the present invention does not have to generate half-pel for motion estimation, the calculation amount is amazingly reduced and the calculation time is reduced.

5 Claims, 2 Drawing Sheets

FAST HALF-PEL SEARCHING METHOD ON THE BASIS OF SAD VALUES ACCORDING TO INTEGER-PEL SEARCH AND RANDOM VARIABLE CORRESPONDING TO EACH MACRO BLOCK

BACKGROUND OF THE INVENTION

1. Field of the Invention

The present invention relates to a half-pel searching method of a moving picture encoder, and more particularly, to a fast half-pel searching method for reducing calculation amount and calculation time. In the fast half-pel searching method of the present invention, half-pels are estimated and searched by using a stochastically selected value and SAD values of eight surrounding pixels used in searching for integer-pels to remove the necessity to access to a memory for integer-pel data, so that calculation amount and calculation time are reduced.

2. Description of the Related Art

Digital image data is generally used in video conference, a high fidelity Television, a video-on-demand (VOD) receiver, a moving picture experts group (MPEG) image supporting personal computer, a video game system, a digital ground wave broadcast system, a digital satellite broadcast system and a cable television (CATV). The digital image data is however not used as itself but is rather compressed by an efficient compression method because the data amount is greatly increased due to the characteristics of the image and the process for converting an analog signal into a digital signal.

Three compression methods are generally being used for the compression of digital image data. Mainly used are a method to reduce temporal redundancy, a method to reduce special redundancy and a compression method using stochastic properties of generation codes. The representative method to reduce temporal redundancy is the motion estimation and compensation method, which is being used in most moving picture compression standards such as MPEG, H.263, etc.

The motion estimation and compensation method is used to search for the most similar portion from a previous or next reference screen with respect to the particular portion of a current screen, and transmit only the difference components between the two portions. In the motion estimation and compensation method, the more finely motion vectors are searched, the more the amount of the difference components to be transmitted is reduced so that the amount of data is effectively reduced. However, to search the most similar portion from the previous or next screen, a large amount of estimation time and a calculation amount are required. Accordingly, it has been studied to reduce the motion estimation time that occupies the largest amount when the moving picture is encoded.

On the other hand, there are a pixel-by-pixel basis estimation method and a block-by-block basis estimation method as the motion estimation method. The block-by-block basis estimation method is the most popularly used representative algorithm.

In the block-by-block basis estimation method, image is divided into blocks of a predetermined size and the most matched block with the block of a current image is found in the search region of the current image. The difference between the found block and the current image block is called a motion vector. The motion vector is encoded and processed. Various match functions can be used for a match calculation of two blocks. The most popular function is the sum of absolute difference (SAD) value that is the sum of absolute values of differences of pixels between two blocks.

Thus, after the final integer-pel is obtained by integer-pel search, a better quality image is displayed through half-pel search in the moving picture standards such as MPEG-2 or more developed versions. In such a half-pel search, half-pels are calculated for eight pixels around the finally obtained integer-pel, the SAD values are obtained for the obtained half-pel blocks, and the half-pel having the smallest SAD value is searched.

However, in the conventional half-pel searching method, integer-pel data is used repeatedly and also the integer-pels have to be read at least four times randomly, it requires a calculation time at least four times as much as that required by the integer-pel searching method for one block. Since most of multimedia machines use SDRAM, when random memory access such as a half-pel search occurs, the half-pel search requires a considerable calculation time actually as a large amount of delay time is elapsed.

Therefore, the efficient implementation of the half-pel search, which is essentially included in the moving picture-related standards such as MPEG-2 or more developed versions, is the core in encoding the moving picture in real-time, and has been being researched and developed.

SUMMARY OF THE INVENTION

Accordingly, the present invention is directed to a fast half-pel searching method on the basis of SAD values according to integer-pel search and random variable corresponding to each macro block, which substantially obviates one or more problems due to limitations and disadvantages of the related art.

It is an object of the present invention to provide a fast half-pel searching method based on SAD values according to integer-pel search and a random variable, in which the SAD values according to the integer-pel search and a random compensation value are used to estimate half-pel in searching for the half-pel of the moving picture object block, thereby minimizing the repeated memory access for integer-pel data and implementing the fast half-pel search without lowering performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a fast half-pel searching method on the basis of SAD values according to integer-pel search and random variable, comprises the steps of: (a) calculating integer SAD values of blocks of a current frame with reference to a corresponding block of any one selected from the group consisting of a previous reference frame and a next reference frame, and performing integer-pel search, the current frame being divided into the blocks of predetermined size, the block of the reference frame having a predetermined size; and (b) performing half-pel search based on a primary combination of integer-pel SAD values used in the integer-pel search and a correction value of a random variable.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
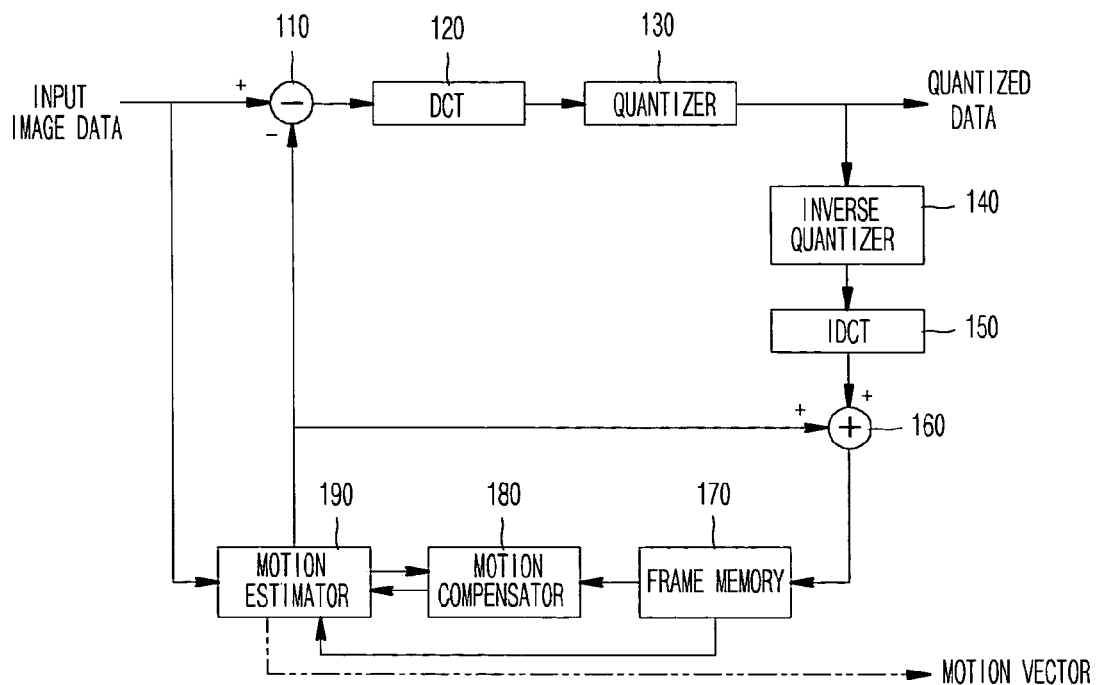
FIG. 1 is a block diagram illustrating moving picture encoder applied to the present invention.

FIG. 1 is a block diagram illustrating moving picture encoder applied to the present invention.

In general, a moving picture encoder performs infra-frame compression and inter-frame compression, and also performs infra-frame (I frame) compression, predicted frame (P frame) compression and bidirectional frame (B frame) compression according to the corresponding sequence.

I frame pixel data is a reference frame data. It is not affected by a subtractor 110 but just outputted to a discrete cosine transformer 120. The discrete cosine transformer 120 performs discrete cosine transformation (DCT) by 8×8 pixel block. A quantizer 130 quantizes DCT data.

The compressed I frame outputted from the quantizer 130 is inverse quantized by an inverse quantizer 140. An inverse discrete cosine transformer 150 performs inverse discrete cosine transformation (IDCT) on the inverse quantized I frame and inputs decompressed I frame to an adder 160.

The decompressed I frame is not affected by the adder 160 but just transferred as itself to a frame memory that plays a role of a buffer so that the decompressed I frame is stored so as to perform prediction compression on the P frame and the B frame.

The prediction encoding sequences for the P frame and the B frame is similar to each other and P frame compression process will be described.

First, the image frames stored in the frame memory 170 are supplied to a motion estimator 190.

The motion estimator 190 calculates the motion vector by using currently inputted image data and the image data of a previous or next frame stored in the frame memory 170, and outputs the calculated motion vector to a motion compensator 180.

The motion compensator 180 reads the block corresponding to the motion vector estimated by the motion estimator 190 from the frame memory 170 and supplies the block to the subtractor 110.

Here, the subtractor 110 subtracts a predicted block outputted from the frame memory 170 through the motion compensator 180, from the block corresponding to the frame to be currently decompressed, pixel by pixel. The difference or residue obtained by subtraction of the subtractor 110 is inputted to the discrete cosine transformer 120.

The compressed P frame is decoded by the inverse quantizer 140 and the inverse discrete cosine transformer 150. The decoded data is inputted to a first input terminal of the adder 160. At the same time, each block of the reference image frame stored in the frame memory 170 is accessed to and the accessed block is inputted to a second input terminal of the adder 160 through the motion compensator 180 so as to predict the current frame.

The adder 160 adds the encoded residue or difference and the data outputted from the motion compensator 180 and restores an actual image. The P frame restored by the adder is stored in the frame memory 170 so as to perform prediction encoding/decoding on the P frame and the B frame later.

A variable length encoder (not shown) performs run length encoding and stochastic encoding on quantized data, multiplexes the stochastically encoded image data, the motion vector inputted from the motion estimator 190 and augmented information such as macro block type, and outputs the multiplexed signal. A buffer (not shown) temporarily stores and then outputs encoded data so as to control bit rate of the multiplexed image data.

Figure 2:
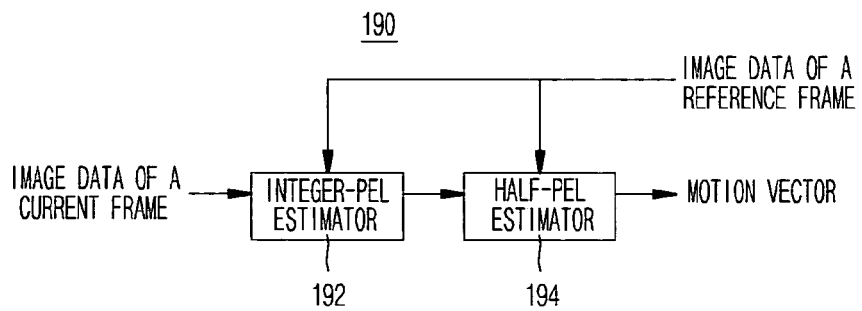
FIG. 2 is a block diagram illustrating a motion estimator according to the present invention.

FIG. 2 is a block diagram illustrating a motion estimator according to the present invention. The motion estimator 190 includes an integer-pel estimator 192 and a half-pel estimator 194. The integer-pel estimator 192 estimates the motion vector of integer-pel unit. The half-pel estimator 194 estimates the motion vector of half-pel unit on the basis of the found motion vector of integer-pel unit.

The integer-pel estimator 192 divides the current block to be compressed into macro blocks, estimates motion vector of integer-pel unit for the divided current frame by using an integer-pel prediction method in a search region of a previous or next reference frame, and outputs the motion vector. The integer-pel prediction method will be described later.

The half-pel estimator 194 estimates optimal motion vector of half-pel unit on the basis of the motion vector of integer-pel unit.

The motion vector estimation method of fast half-pel search and half-pel unit, which is suggested by the present invention, will be described on the basis of the motion vector of integer-pel unit in the motion estimator (especially, half-pel estimator).

First, the difference between the related art and the present invention will be described to make it easier to understand the present invention.

To search the half-pel, after integer-pel search is finished, the existing integer-pel and the surrounding integer-pels are combined primarily to generate a half-pel, and then the SAD values between the current block and the made half-pel block is obtained to perform half-pel search. Accordingly, since the surrounding integer-pel should be used over and over to generate half-pel, the frame memory should be accessed to frequently. This is a main factor to require a large amount of calculation time in the recent multimedia machine that uses an SDRAM usually. Since such a calculation should be repeated eight times to find the optimal half-pel block, the half-pel search requires half or one third of calculation time of the integer search when a three-step integer-pel search algorithm is used.

In contrast, in the present invention, a general half-pel generation and search equation is analyzed to derive the half-pel search equation (equation 8) using only integer-pel SAD value and stochastic compensation value so that the half-pel search is possible despite unnecessary access to integer-pel data of a memory.

In other words, since the half-pel search is possible using an eight half-pels search calculation, the calculation amount will be reduced to be 1/2000 compared with the conventional half-pel search calculation that requires one eight blocks 256 calculations, as described in equations.

Figure 3:
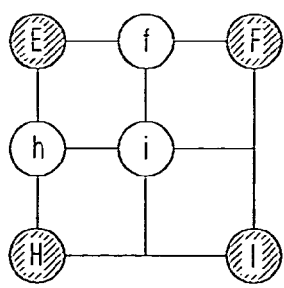
FIG. 3 illustrates a concept of half-pel prediction.

The principle of the present invention will be described using equations 1 through 9. In general, the half-pel is predicted as equation 1 in the case illustrated in FIG. 3.

$$f=(E+F+1-\text{round})//2$$

$$h=(E+H+1-\text{round})//2$$

$$i=(E+F+H+I+2-\text{round})/4 \quad \text{Equation 1}$$

where round is a value selected arbitrarily from 0 and 1, the operator '//' means dividing a left term by a right term and obtaining the largest integer less than the division result.

Figure 4:
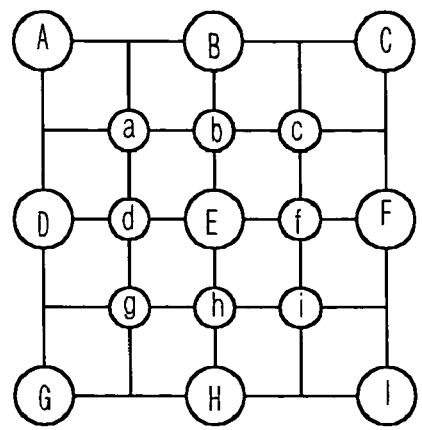
FIG. 4 illustrates a half-pel estimation range.

If equation 1 is applied, the eight half-pels are predicted as shown in FIG. 4, which are surrounding the prediction integer-pel E that is obtained through integer search, and a half-pel block of 16×16 block can be obtained. The half-pel block corresponds to the eight surrounding half-pels with respect to an integer block that has the leftmost and uppermost pixel of the 16×16 block as a prediction integer-pel. In the half-pel search, selected is the minimum SAD value of SAD values between each half-pel block and a prediction integer-pel block. In FIG. 4, large letter of alphabets represents an integer-pel and small letter of alphabets represents a half-pel. The prediction integer-pel is the center integer-pel E of nine integer-pels.

The conventional half-pel searching method will be reviewed using equations 2 and 3.

Figure 5:
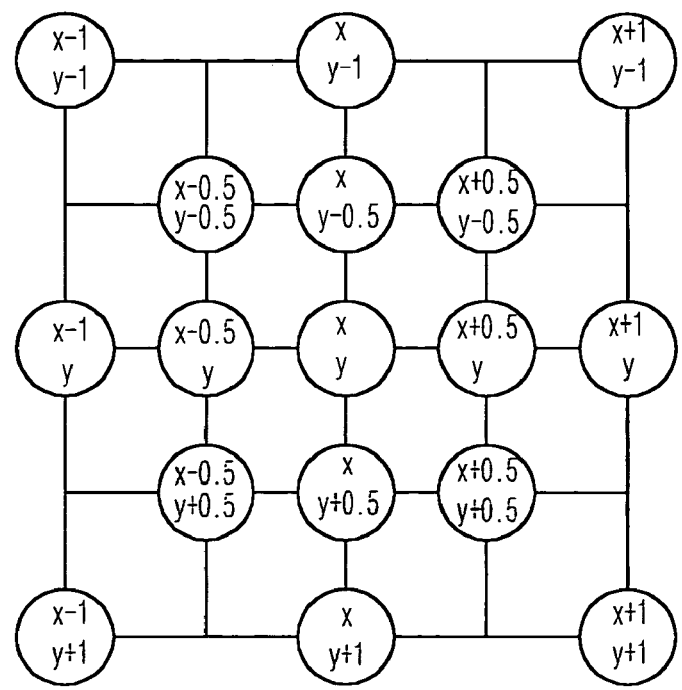
FIG. 5 illustrates a coordinate concept of half-pel estimation range according to the present invention.

Most of all, suppose that the prediction integer-pel is $P_x^y$ as a reference. The subscript x and superscript y are x-coordinate and y-coordinate of the prediction integer-pel. The integer-pel increase and decreases by integer unit and the half-pel increases and decreases by 0.5 unit. When applying them to FIG. 4, the integer-pels and the half-pels as shown in FIG. 5. If the half-pel located at x−0.5 and y−0.5 with respect to prediction integer-pel $P_x^y$ is called $h_{x-0.5}^{y-0.5}$ and round value is 0, the half-pel $h_{x-0.5}^{y-0.5}$ is represented as a primary combination of an integer-pel $I_{x+\Delta}^{y+\Delta}$ surrounding the prediction integer-pel $P_x^y$ as shown in FIG. 2. Here, the prediction integer-pel $P_x^y$ is the current frame value and the surrounding integer-pel $I_{x+\Delta}^{y+\Delta}$ is a past frame value.

$$h_{x-0.5}^{y-0.5} = \frac{I_{x-1}^{y-1} + I_x^{y-1} + I_{x-1}^{y} + I_x^{y} + 2}{4} \quad \text{Equation 2}$$

The SAD value between a 16×16 prediction integer-pel block and the half-pel $h_{x-0.5}^{y-0.5}$ is calculated as equation 3 by using the half-pel equation defined in equation 2.

$$SAD(P_x^y, h_{x-0.5}^{y-0.5}) = \sum_x^{x+15} \sum_y^{y+15} |P_x^y - h_{x-0.5}^{y-0.5}| \quad \text{Equation 3}$$

Meanwhile, considering the half-pel is the primary combination of the integer-pel as equation 2, all the relations of SAD value that is a difference between the integer-pel and the half-pel are converted into equations of integer-pels to obtain the relation shown in equation 4.

$$\sum_x^{x+15} \sum_y^{y+15} |P_x^y - h_{x-0.5}^{y-0.5}| = \sum_x^{x+15} \sum_y^{y+15} \left| P_x^y - \frac{I_{x-1}^{y-1} + I_x^{y-1} + I_{x-1}^{y} + I_x^{y} + 2}{4} \right|$$

$$= \sum_x^{x+15} \sum_y^{y+15} \left| \frac{4P_x^y}{4} - \frac{I_{x-1}^{y-1} + I_x^{y-1} + I_{x-1}^{y} + I_x^{y} + 2}{4} \right|$$

$$= \frac{1}{4} \sum_x^{x+15} \sum_y^{y+15} \left| P_x^y - I_{x-1}^{y-1} + P_x^y - I_x^{y-1} + P_x^y - I_{x-1}^{y} + P_x^y - I_x^{y} + 2 \right|$$

$$= \frac{1}{4} \sum_x^{x+15} \sum_y^{y+15} (|P_x^y - I_{x-1}^{y-1}| + |P_x^y - I_x^{y-1}| + |P_x^y - I_{x-1}^{y}| + |P_x^y - I_x^{y}| + 2)$$

$$= \frac{1}{4} \left( \sum_x^{x+15} \sum_y^{y+15} |P_x^y - I_{x-1}^{y-1}| + \sum_x^{x+15} \sum_y^{y+15} |P_x^y - I_x^{y-1}| + \sum_x^{x+15} \sum_y^{y+15} |P_x^y - I_{x-1}^{y}| + \sum_x^{x+15} \sum_y^{y+15} |P_x^y - I_x^{y}| + M_{0.5}^{0.5} \right)$$

$$= \frac{1}{4} (E_{x,x-1}^{y,y-1} + E_{x,x}^{y,y-1} + E_{x,x-1}^{y,y} + E_{x,x}^{y,y} + M_{0.5}^{0.5})$$

Equation 4

Also, the result of equation 4 is applied to residue half-pel search to obtain equation 5.

$$\sum_{x}^{x+15}\sum_{y}^{y+15}|P_x^y - h_{x+0.5}^{y-0.5}| \leq \frac{1}{4}\left(E_{x,x+1}^{y,y-1} + E_{x,x}^{y,y-1} + E_{x,x+1}^{y,y} + E_{x,x}^{y,y} + M_{0.5}^{0.5}\right)$$

$$\sum_{x}^{x+15}\sum_{y}^{y+15}|P_x^y - h_{x-0.5}^{y+0.5}| \leq \frac{1}{4}\left(E_{x,x-1}^{y,y+1} + E_{x,x}^{y,y+1} + E_{x,x-1}^{y,y} + E_{x,x}^{y,y} + M_{0.5}^{0.5}\right)$$

$$\sum_{x}^{x+15}\sum_{y}^{y+15}|P_x^y - h_{x+0.5}^{y+0.5}| \leq \frac{1}{4}\left(E_{x,x+1}^{y,y+1} + E_{x,x}^{y,y+1} + E_{x,x+1}^{y,y} + E_{x,x}^{y,y} + M_{0.5}^{0.5}\right)$$

$$\sum_{x}^{x+15}\sum_{y}^{y+15}|P_x^y - h_x^{y-0.5}| \leq \frac{1}{2}(E_{x,x}^{y,y-1} + E_{x,x}^{y,y} + M^{0.5})$$

$$\sum_{x}^{x+15}\sum_{y}^{y+15}|P_x^y - h_{x-0.5}^{y}| \leq \frac{1}{2}(E_{x,x-1}^{y,y} + E_{x,x}^{y,y} + M_{0.5})$$

$$\sum_{x}^{x+15}\sum_{y}^{y+15}|P_x^y - h_x^{y+0.5}| \leq \frac{1}{2}(E_{x,x}^{y,y+1} + E_{x,x}^{y,y} + M^{0.5})$$

$$\sum_{x}^{x+15}\sum_{y}^{y+15}|P_x^y - h_{x+0.5}^{y}| \leq \frac{1}{2}(E_{x,x+1}^{y,y} + E_{x,x}^{y,y} + M_{0.5})$$

Equation 5

In equations 4 and 5, $M_{0.5}^{0.5}$, $M^{0.5}$ and $M_{0.5}$ are accumulated values of round-off errors. Supposing that there are round values for correcting them, the average is zero. Also, $E_{x,x+\delta}^{y,y+\lambda}$ is the integer-pel SAD value defined as equation 6.

$$E_{x,x+\delta}^{y,y+\lambda} = \sum_{x}^{x+15}\sum_{y}^{y+15}|P_x^y - I_{x+\delta}^{y+\lambda}|$$

Equation 6

In equation 6, $\lambda$ and $\delta$ are integers among −1, 0 and 1. As suggested in equations 4 and 5, since the SAD value of the half-pel estimated from the SAD value of the integer-pel is greater than the SAD value of the actual half-pel, it is not preferable to directly estimate the half-pel with the SAD value of the half-pel so that the half-pel estimation should be made by giving proper correction values.

An embodiment of a stochastic method to obtain the correction value will be described as follows.

Since the maximum value of the SAD values between integer-pels is 256, SAD values between integer-pels are in the range from −256 to +256. Since the values from 0 to +256 are positive, the interesting part is negative integers in the range from −256 to 0.

It is assumed that the SAD value between integer-pels, and a normal distribution and the smallest SAD value is selected by the optimal integer-pel search. When the error per pixel is about 1% around the optimal integer-pel, the overall error is 512 and variance is about 5. Accordingly, in the distribution of SAD values that has normal distribution whose variance is 5 and whose average is 0, the average of negative integer part is calculated as equation 7.

$$M \cdot \sum_{k=-256}^{0} k \cdot p_N(k, 0, 5)$$

Equation 7

In equation 7, M is all the pixel values of the object blocks. In case of a 16×16 block, M is 245 and $P_N(k, 0, 5)$ is a probability density function at the value k in a normal distribution whose average is 0 and whose variance is 5. In this case, since the values of the portion beside M are about −2, −512 is obtained as the result of equation 7. Therefore, SAD value of the half-pel is corrected with a random variable whose value is in the range from 0 to −512 and can be estimated as equation 8.

$$\sum_{x}^{x+15}\sum_{y}^{y+15}|P_x^y - h_{x+0.5\delta}^{y+0.5\lambda}| : \frac{1}{2(|\lambda|+|\delta|)}\left(\sum_{\lambda}\sum_{\delta}E_{x,x+\delta}^{y,y+\lambda} + M_{0.5|\delta|}^{0.5|\lambda|}\right) +$$

$$R_N\left(M\sum_{k=-256}^{0}k \cdot p_N(k, 0, 5)\right)$$

$$= H_{x+0.5\delta}^{y+0.5\lambda}$$

Equation 8

In equation 8, R(x) is a correction value that is a random variable in the range from 0 to x.

As described above, if the result of the half-pel search is obtained by correcting the integer-pel SAD value and the random variable, the final motion vector can be obtained by the results of the integer-pel search and the half-pel search as equation 9.

$$MV = \operatorname*{argmin}_{\lambda,\delta}\left(E_{x,x}^{y,y}, H_{x+0.5\delta}^{y+0.5\lambda}\right)$$

Equation 9

As described above, in the fast half-pel searching method on the basis of SAD values according to integer-pel search and random variable corresponding each macro block according to the present invention, since the half-pel estimation is performed using the SAD values between integer-pels and the random variables so as to search for half-pel motion of MPEG standards such as MPEG-1, MPEG-2, MPEG-4, etc. and moving picture standards of ITU such as H261, H263, H.26L, H264, etc., the calculation amount for motion estimation is amazingly reduced, and accordingly the calculation time and the complexity of hardware is amazingly reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A fast half-pel searching method on the base of SAD values according to integer-pel search and random variable, the method comprising the steps of:
   (a) calculating integer SAD values of blocks of a current frame with reference to a corresponding block of any one selected from the group consisting of a previous reference frame and a next reference frame, and performing integer-pel search, the current frame being divided into the blocks of predetermined size, the block of the reference frame having a predetermined size; and (b) performing half-pel search based on primary combination of integer-pel SAD values used in the integer-pel search and correction value of a random variable.

2. The method of claim 1, wherein the step (a) comprises the steps of:

calculating SAD values of a block of eight surrounding integer-pel with reference to a reference integer-pel, the block having predetermined size; and storing the SAD values of the eight surrounding integer-pel in a memory.

3. The method of claim 1, wherein, at the step (b), in performing half-pel search for a block of predetermined size, the SAD values of eight half-pels surrounding a prediction integer-pel are estimated as primary combination of SAD values of the integer-pel as a following equation:

$$\sum_{x}^{x+15}\sum_{y}^{y+15} |P_x^y - h_{x+0.5\delta}^{y+0.5\lambda}| : \frac{1}{2(|\lambda|+|\delta|)}$$

$$\left(\sum_{\lambda}\sum_{\delta} E_{x,x+\delta}^{y,y+\lambda} + M_{0.5|\delta|}^{0.5|\lambda|}\right) + R_N \quad \text{[Equation]}$$

for a block of 16×16 size where $P_x^y$: a prediction integer-pel value according to coordinates x and y, $\lambda$ and $\delta$: an integer −1, 0 and 1, $E_{x,x+\delta}^{y,y+\lambda}$:

an integer-pel SAD value, $M_{0.5|\delta|}^{0.5|\lambda|}$:

an accumulated value of a round-off error, and $R_N$: a correction value.

4. The method of claim 3, wherein, at the step (b), in performing half-pel search for a block of predetermined size by using the integer SAD value and a random variable correction value, the SAD values of eight half-pels surrounding a prediction integer-pel are corrected based on the random variable as a following equation:

$$\sum_{x}^{x+15}\sum_{y}^{y+15} |P_x^y - h_{x+0.5\delta}^{y+0.5\lambda}| : \frac{1}{2(|\lambda|+|\delta|)} \quad \text{[Equation]}$$

$$\left(\sum_{\lambda}\sum_{\delta} E_{x,x+\delta}^{y,y+\lambda} + M_{0.5|\delta|}^{0.5|\lambda|}\right) +$$

$$R_N\left(M\sum_{k=-256}^{0} k \cdot p_N(k, 0, 5)\right)$$

$$= H_{x+0.5\delta}^{y+0.5\lambda}$$

where $R_N(x)$: a correction value that is a random variable in the range from 0 to x, and $P_N(k,0,5)$ is a probability density function value at a value k in a normal distribution that has mean of 0 and variance of 5.

5. A fast half-pel searching method on the base of SAD values according to integer-pel search and random variable, the method comprising the steps of:

(a) calculating integer SAD values of blocks of a current frame with reference to a corresponding block of any one selected from the group consisting of a previous reference frame and a next reference frame, and performing integer-pel search, the current frame being divided into the blocks of predetermined size, the block of the reference frame having a predetermined size; and (b) performing half-pel search based on primary combination of integer-pel SAD values used in the integer-pel search and correction value of a random variable;

wherein step (a) further comprises the steps of:

calculating SAD values of a block of eight surrounding integer-pel with reference to a reference integer-pel, the block having predetermined size; and storing the SAD values of the eight surrounding integer-pel in a memory.

* * * * *